United States Patent [19]

Mathwich

[11] 3,938,045

[45] Feb. 10, 1976

[54] TRANSMITTER FOR FREQUENCY SHIFT KEYED MODULATION

[75] Inventor: Howard Robert Mathwich, Cherry Hill, N.J.

[73] Assignee: RCA Corporation, New York, N.Y.

[22] Filed: July 3, 1974

[21] Appl. No.: 485,519

[52] U.S. Cl............................ 325/163; 178/66 A
[51] Int. Cl.² ................................. H04L 27/12
[58] Field of Search........... 178/66 R, 66 A; 325/30, 325/163

[56] References Cited
UNITED STATES PATENTS

| | | |
|---|---|---|
| 3,205,441 | 9/1965 | Likel.................................. 325/163 |
| 3,582,782 | 6/1971 | Danielson ............................ 325/30 |
| 3,701,053 | 10/1972 | deRubinat........................... 325/163 |
| 3,731,233 | 5/1973 | Hutchinson....................... 178/66 R |

*Primary Examiner*—George H. Libman
*Attorney, Agent, or Firm*—Edward J. Norton; Joseph D. Lazar; Michael A. Lechter

[57] ABSTRACT

A transmitter for communicating binary data by minimum shift keying (MSK) wherein control of the radiated spectrum of the transmitted signal is achieved by controlling the rate of switching between mark and space frequency signals such that the MSK switch acts as an equivalent of a low pass filter.

8 Claims, 3 Drawing Figures

TRANSMITTER FOR FREQUENCY SHIFT KEYED MODULATION

BACKGROUND OF THE INVENTION

1. Field of the Invention

This invention relates to minimum shift keying ((MSK) transmitters.

2. Description of the Prior Art

Digital communication systems frequently have two design criteria which are of importance: the use of minimal r.f. spectrum and the ability to be transmitted through transmitters having non-linear amplitude transfer functions. The former stems from an ever increasing use of the r.f. spectrum. The latter stems from the observation that most medium and high output power transmitters perform with higher efficiency when they operate at or near saturation of their input vs. output amplitude transfer function.

Frequency shift keying (FSK), a technique of communicating digital information using discrete frequencies to represent specified symbols, has properties desirable in satisfying both of the above criteria. Binary FSK, for example, transmits a first (mark) frequency to represent a binary one and a second (space) frequency to represent a binary zero. The amplitude of the carrier, in the ideal case, is invariant and thus can pass through non-linear amplifiers with minimal degradation of signal quality. Further, proper choice of the difference between the mark and space frequencies and the time of switching between these frequencies can provide strict control and minimization of the radiated spectrum thereby minimizing the required channel bandwidth and the spurious emission of power outside the channel bandwidth. This reduces interference with other channels or services.

Minimum shift keying (MSK) is the special case of FSK wherein the bandwidth of the system is minimized (i.e. the difference between the respective mark and space frequencies is at the minimum value) also preserving an antipodal relationship between the mark and space symbols thereby making available high efficiency detection techniques. Continuous phase is maintained in the MSK signal at the transitions between the mark and space frequency signals to decrease spurious emissions of signals outside of the bandwidth, a phenomenon sometimes called "spectrum splatter".

Such conditions are met advantageously by maintaining phase-lock between the mark and space frequency signals and maintaining the separation between the mark frequency ($f_m$) and the space frequency ($f_s$) precisely one-half of the bit rate (R) of the binary information to be communicated, that is;

$$f_m - f_s = R/2 \qquad (1)$$

It is assumed, for the purposes of discussion, that $f_m$ is greater than $f_s$. Such a case, however, is not a requirement of or a limitation on the system.

In order to control further the radiated spectrum for an MSK signal, the MSK signal has conventionally been band limited by a series of bandpass filters. However, the design requirements of such bandpass filters are quite complex and severe. For instance, an MSK signal is conventionally formed by generating mark frequency and space frequency signals, and producing therefrom what may be termed an MSK-intermediate frequency (IF) signal comprising a sequence of bits of the mark and space frequency signals in accordance with the binary data to be communicated. The MSK-IF signal is subsequently translated by an RF local oscillator frequency signal to the output RF frequencies. To reduce spectrum splatter, the MSK-IF signal is passed through a bandpass filter prior to being translated by the local oscillator frequency signal thereby attenuating sidebands.

In practice, the use of complex bandpass filters in many applications is disadvantageous, in addition to the difficulty in design, in that the expense, required volume and weight of such filters increases as a function of its complexity.

The present invention reduces the severity of the requirements on the bandpass filters by utilizing, for the production of the keying signal, an analog switch which, in itself, acts as the equivalent of a bandpass filter. Moreover the present invention further reduces the severity of the design requirements on the bandpass filters by making possible the use of this bandpass filtering at IF rather than RF frequencies. Thus, less stringent and complex filters may be utilized in the transmitter and the expense, size and weight of the transmitter is thereby reduced.

SUMMARY OF THE INVENTION

The present invention provides a transmitter for communicating binary data by minimum shift keying. The MSK signal comprises alternatively bits of specified mark frequency and space frequency signals in accordance with the binary data, the mark and space frequencies being, respectively, indicative of predetermined binary bit values in the data. The transmitter comprises means for generating the mark and space frequency signals. Analog switching means, which is receptive of the mark and space frequency signals and binary data, produces a MSK-IF signal, in accordance with the binary data, effecting transitions between the mark frequency and space frequency signals in such a manner that the derivatives with respect to time of the phase of the MSK-IF signal at the transitions are maintained at a reduced value. Spurious emissions are thereby controlled. Up converter means, receptive of the local oscillator frequency signal and MSK-IF signal, translates the MSK-IF signal to the desired transmission frequencies.

DESCRIPTION OF THE DRAWING

Embodiments of the invention are described in the following detailed description taken in connection with the accompanying drawing wherein.

DETAILED DESCRIPTION OF THE PREFERRED EMBODIMENT

The communication of data by minimum shift keying (MSK) entails translating, by a specified local oscillator frequency ($f_0$), a minimum shift keying, intermediate frequency (MSK-IF) signal. The term "MSK-IF signal" is used herein in the sense that the translation acts to translate or up-convert the information signals (MSK-IF) to the desired transmission frequencies of the system, by the local oscillator frequency ($f_0$) signal, in a manner, it will be appreciated, that is inversely analogous to receiver action wherein an IF signal is utilized. The MSK-IF signal comprises, in accordance with the data to be communicated, bits of mark frequency ($f_m$) and space frequency ($f_s$) signals. The mark frequency is requisitely separated from the space frequency by exactly one-half bit rate of the data in accordance with the relation (1) described above.

The transition between bits of mark frequency and space frequency signals have been a source of undesirable transient and spurious emissions, which have made requisite in conventional systems complex and expensive filtering schemes.

The present invention is concerned with, in particular, a minimum shift keying transmitter wherein the complexity of the filters has been substantially reduced by utilization of an analog switch, for the production of the MSK-IF signal, which functions to be [acts in itself as] the equivalent of a bandpass filter. This is accomplished, as will be described, by controlling the amplitude of the mark and space frequency signals as a function of time during transitions therebetween. The amplitudes are controlled such that the derivatives with respect to time of the phase of the MSK-IF signal at the transitions are maintained at reduced values.

Figure 1:
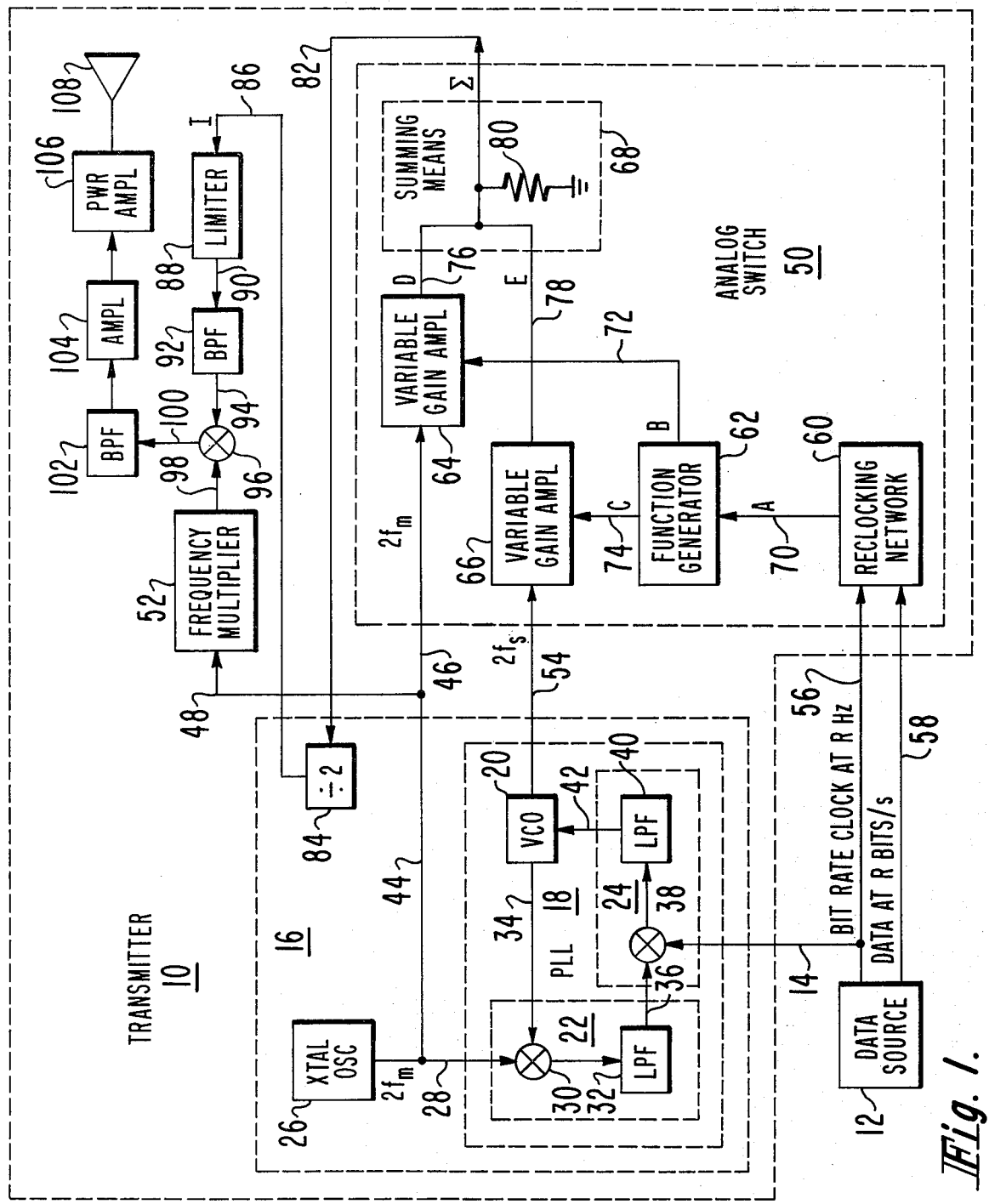
FIG. 1 is a block schematic illustration of an MSK transmitter in accordance with the present invention.

Referring now to the drawing, there is shown in FIG. 1, an MSK transmitter in accordance with the present invention, generally indicated as 10. A suitable data source 12 provides to the MSK transmitter 10, over conductor 14, a clock signal indicative of the bit rate R of the binary data to be transmitted, preferably an NRZ type signal. More specifically, the bit rate signal on conductor 14 is applied to signal generating means, generally indicated as 16, for generating mark ($f_m$) and space ($f_s$) frequency signals associated with the MSK-IF signal. The bit rate signal on conductor 14 is applied to a phase locked loop 18 comprising a voltage controlled oscillator (VCO) 20 and a first and second subtraction means 22 and 24, respectively. A second input signal to phase lock loop 18 is a signal ($2f_m$) at twice the specified mark frequency as applied over conductor 28 from a suitable frequency source such as crystal oscillator 26. The $2f_m$ signal is received by first subtration means 22, suitably a conventional double balanced mixer (DBM) 30 connected to a suitable low pass filter (LPF) 32. The second input signal to first subtraction means 22 iis the output signal of VCO 20, as applied over conductor 34. The output signal of first subtraction means 22 is applied over conductor 36 to second subtraction means 24, suitably, a conventional DBM 38 coupled to a suitable low pass filter 40. The second input signal to second subtraction means 24 is the bit rate signal as previously described applied over conductor 14. The output signal of subtraction means 24 is applied over conductor 42 as a control signal to VCO 20. The output signal of VCO 20 is maintained, as will hereinafter be explained, at twice the space frequency ($2f_s$), in accordance with the requisite MSK relationship, and is also the output signal of phase locked loop 18.

The $2f_s$ signal of phase locked loop 18 is maintained with the requisite phase lock and frequency separation relationship to the $2f_m$ signal generated by crystal oscillator 26 in the manner described as follows. First subtraction means 22 serves to subtract the instantaneous $2f_s$ signal, as generated by VCO 20, from the instantaneous $2f_m$ signal generated by crystal oscillator 26. In accordance with the requisite MSK relationship, ($f_m - f_s$) = $R/2$, it is desired that the frequency separation between the $2f_s$ and $2f_m$ frequency signals be equal to the bit rate R. Thus, second subtraction means 24, which is receptive of the output signal of first subtraction means 22 (indicative of the instantaneous frequency separation) and the actual bit rate signal (as applied over conductor 14) produces an error signal indicative of the frequency and phase deviations between the instantaneous and the requisite frequency separation. The error signal is accordingly applied as a control signal to VCO 20.

The $2f_m$ signal from crystal oscillator 26 is also applied over conductor 44 and therefrom over conductors 46 and 48 to an analog switch, generally indicated as 50, and a frequency multiplier 52, respectively. The output signal of phase lock loop 18 is applied over conductor 54 to the analog switch 50 as previously indicated. Analog switch 50 also receives, as input signals from data source 12, a bit rate signal (R) over conductor 56 and binary data to be communicated over condctor 58.

Frequency multiplier 52 derives the local oscillator frequency ($f_0$) signal used to translate the MSK-IF signal to the desired transmission frequency range, as will be explained.

Thus, both the mark and space frequency signals and the local oscillator frequency signal are derived from a common source. It should be appreciated that separate sources can be used, but the utilization of a common source, such as in the preferred embodiment, is desirable, in that it further reduces the complexity, and hence the weight of the transmitter.

Analog switch 50, in the preferred embodiment, comprises a reclocking network 60, a suitable function generator 62, first and second variable gain amplifiers 64 and 66, respectively, and suitable summing means 68. Reclocking network 60 receives as input signals the bit rate signal (R) over conductor 56 and the data over conductor 58, and generates an output signal A. Output signal A is applied over conductor 70 to function generator 62. Function generator 62, in turn, produces a first output signal B and its inverse C, as a second output signal, which signals are applied over conductors 72 and 74 as control signals to first and second variable gain amplifiers 64 and 66, respectively. First variable gain amplifier 64 receives as an input signal the $2f_m$ signal over conductor 46. The second variable gain amplifier 66 is receptive of the $2f_m$ signal over the conductor 54. First and second variable gain amplifier 64 and 66 respectively produce output signals D and E which are respectively applied over conductors 76 and 78, to summing means 68, suitably a resistor 80 connected to ground. The output signal $\epsilon$ of summing means 68 is applied over conductor 82 to a frequency divider 84, suitably a component of signal generating means 16 for generating the mark and space frequencies. Frequency divider 84 produces therefrom the MSK-IF signal. The MSK-IF signal is applied over conductor 86 through a suitable limiter 88, therefrom, over conductor 90 through a bandpass filter 92 and therefrom over conductor 94 to a suitable double balanced modulator 96. The second input to modulator 96 is the output signal of frequency multiplier 52 as applied over conductor 98 the output signal at $f_0$ being derived from the crystal oscillator signal at frequency $2f_m$ as previously indicated. The modulator 96 serves to translate the MSK-IF signal to the desired transmission frequency range. The translated MSK signal from modulator 96 is applied over conductor 100 to a suitable bandpass filter 102. The filtered signal therefrom is thereafter amplified and transmitted by suitable amplifiers 104 and 106 and antenna 108.

In the operation of the preferred embodiment, analog switch 50 produces an output signal ε comprising, in accordance with the data to be transmitted, bits of $2f_m$ and $2f_s$ frequency signals. In accordance with the invention, switch 50 serves, in general, to control the amplitude of the $2f_m$ and $2f_s$ signals as a function of time, such that the derivatives with respect to time of the phase of the MSK-IF signal at the transitions between the $2f_s$ and $2f_m$ frequencies are at reduced values. Thus switch 50 acts as a bandpass filter. The operation of analog switch 50 will be explained with reference to both FIGS. 1 and 2. The binary data to be transmitted and a clock signal at bit rate R [R waveform in FIG. 2] are applied to reclocking network 60 wherein synchronization of the data to the clock signal is assured and any time jitter in the data source 12 is effectively isolated from the system. It should be apparent to those skilled in this art that reclocking network 60 is not necessary to the switching function and may be omitted from the switch when data source 12 is adequately stable. For such an arrangement data over conductor 58 would be applied directly as the signal A to generator 62, and the clock signal R over conductor 56 would not be required.

Figure 2:
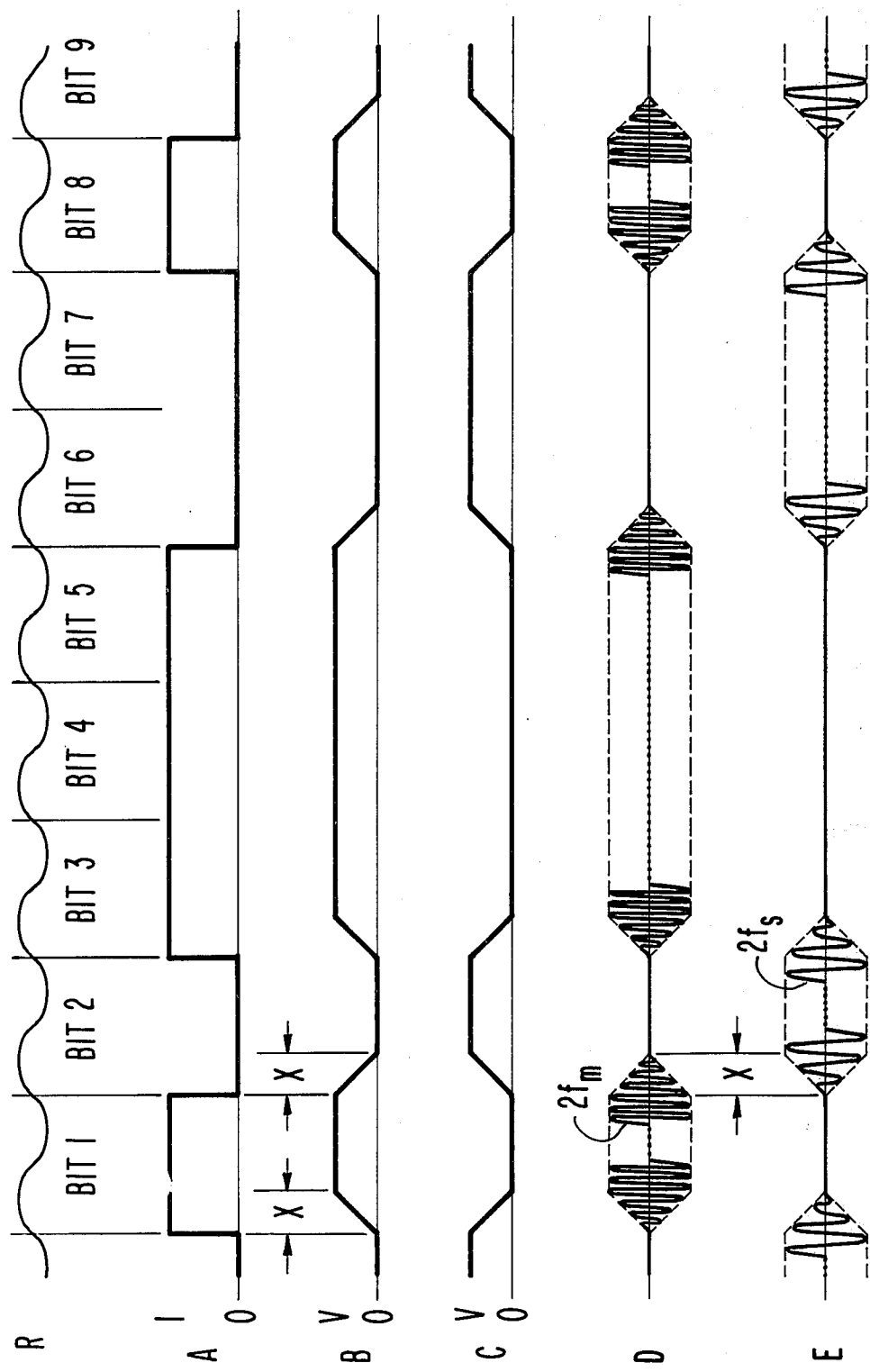
FIG. 2 is a diagram showing the timing relationship and waveform of the various signals involved in an analog switch in accordance with the present invention.

The reclocked data signal from network 60, shown as waveform A in FIG. 2, is applied to function generator 62, (suitably a voltage shaping network) which in turn generates a predetermined waveform B and its inverse C, both shown in FIG. 2, in accordance with the data. The waveforms are essentially bi-level, i.e., O and V volts, having a controlled transition function during a transition interval X, the transition period X being initiated by a change in value of the data as shown in ($X_1$, $X_2$) in FIG. 2. It should be noted that while the waveform A as shown in FIG. 2 is linear during transition intervals $X_1$, $X_2$, it should be understood that the shape of the waveform during the transition intervals, $X_1$, $X_2$, etc. may be arranged to assume any desired shape, whereby the spectral or modulation effects may be controlled. Accordingly, the function generator 62 is designed to produce such desired waveforms by conventional waveform synthesis techniques, as well known in the art. For an explanation of such techniques, reference is made to Van Valkenburg, "Network Analysis", Prentis Hall Inc., Englewood Cliffs, New Jersey, 1964, Chapter 8, section 3.

In the example shown in FIG. 2, the first bit of the data waveform A has the value one (preceded by a zero). Control waveform B accordingly manifests a controlled transition of predetermined shape to its peak value V. Control waveform C, being the inverse of waveform B, similarly manifests a controlled transition from peak value V to zero value. The respective resultant output waveforms D and E of first and second variable gain amplifiers 64 and 66, are accordingly, at the end of transition period $X_1$, respectively, a $2f_m$ signal at its maximum amplitude value and a zero signal. Thus, during data bits of value one the sum signal ε, after a transition period consists substantially of a signal at $2f_m$.

The second bit (BIT 2) of data waveform A in FIG. 2 is at a zero value. Control waveform B accordingly manifests a controlled transition to zero value and control waveform C similarly effects a transition to maximum value V during the period $X_2$. The amplitude of the signal D from amplifier 64 assumes, after transition interval $X_2$, a zero value, while signal E from second amplifier 66 achieves maximum amplitude. Thus, during data bits of zero value, after a controlled transition, the sum signal ε consists substantially of a signal at $2f_s$.

The controlled transition during transition periods operates to effect a relatively slow change in the frequency of the sum signal ε either from $2f_s$ to $2f_m$ or from $2f_m$ to $2f_s$, thereby eliminating abrupt transitions and reducing the time derivative of the phase of the sum signal. Hence, analog switch 50 by reducing the ratio of transition between mark and space frequencies performs a filtering function, reducing thereby spurious emissions.

Figure 3:
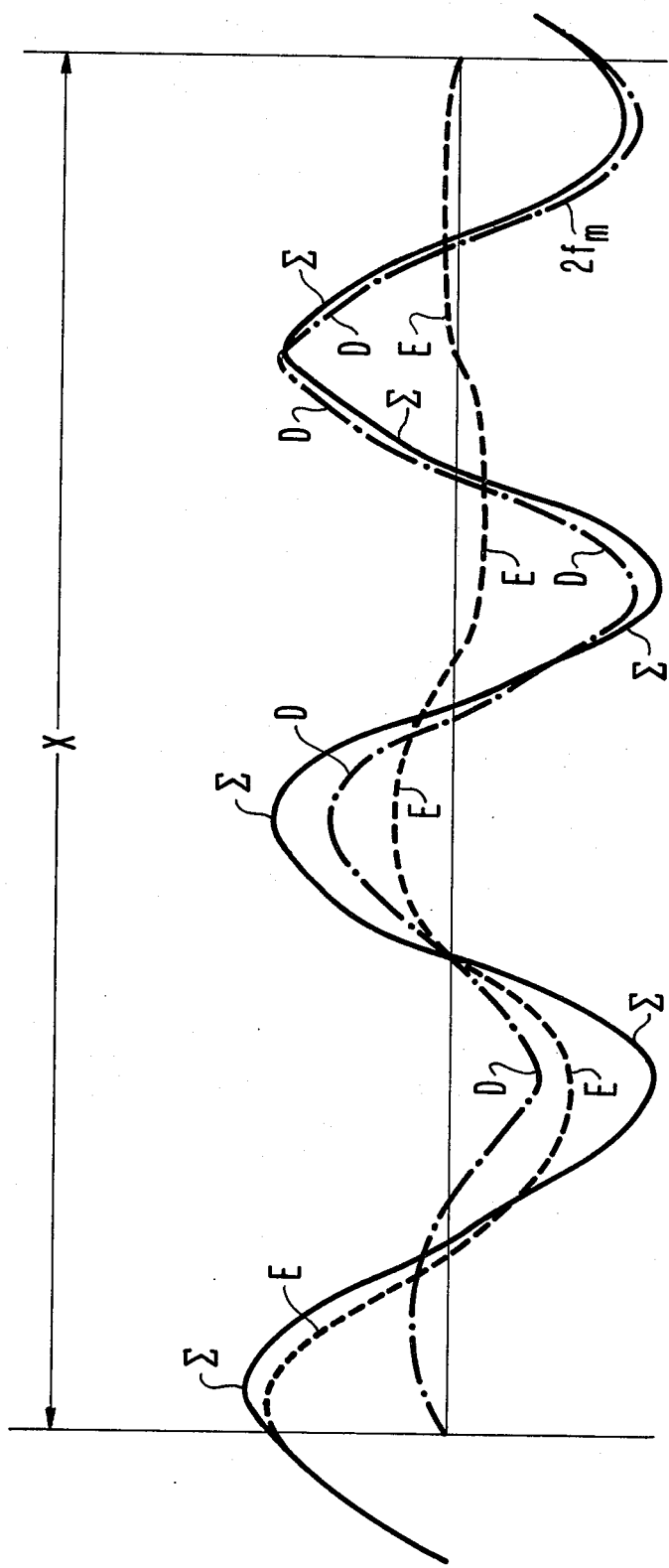
FIG. 3 is a diagram showing in detail the waveform of the signals of FIG. 2 during a transition interval.

FIG. 3 shows in greater detail the waveforms of signals D, E and ε during a transition period from $2f_s$ to $2f_m$. Just prior to a transition period $X_1$, sum signal ε consists solely of the $2f_s$ signal E as at curve portion 120 in FIG. 3. During the transition period, however, the amplitude signal of E decreases to zero, while the $2f_m$ signal D increases by similar increments from zero to its maximum amplitude. The resultant sum signal ε has therefore, by the end of the transition period, gradually changed in frequency from $2f_s$ to the $2f_m$ frequency of signal D, without, it should be noted, passing through abrupt transitions. The increased amplitude if any acquired by the sum signal ε during the transition period, is compensated by limiter 88 which serves to limit the MSK-IF signal to a substantially constant amplitude.

It should be noted that although conductors are shown in the drawing as single lines they are not so shown in a limiting sense, in that the conductors may comprise a plural connections between components as understood in the art.

It should now be understood, that, in accordance with the present invention, an analog switch is provided to effect transitions between the mark and space signal of an MSK transmitter in a predetermined controlled manner to reduce the spectral effects and thereby allow for the use of amplifier and transmitter of restricted bandwidth.

It should be apparent from the foregoing description that the present invention provides a particularly advantageous MSK transmitter. It will be understood that the above description is illustrative of the embodiments of the present invention and that the invention is not limited to a specific form shown. Modifications may be made in the design and arrangement of the elements without departure from the spirit of the invention.

What is claimed is:

1. A transmitter for communicating binary data by frequency shift keying (FSK), wherein the FSK signal comprises bits of mark frequency signals and space frequency signals in accordance with said binary data, said mark frequency and said space frequency being respectively indicative of predetermined values in said data, comprising:

means for generating said mark and space frequency signals;

analog switching means, receptive of said mark and space frequency signals and said binary data, for generating said FSK signal;

said analog switching means effecting, in accordance with said binary data, transitions between said mark frequency signals and said space frequency signals and controlling the respective amplitudes of said mark and space frequency signals during said transitions to lengthen said transitions as compared to an abrupt transition between said mark and space frequency signals, thereby controlling derivatives with respect to time of the phase of said FSK signal at said transitions.

2. A transmitter for communicating binary data by frequency shift keying (FSK), wherein the FSK signal comprises bits of mark frequency signals and space frequency signals in accordance with said binary data, said mark frequency and said space frequency being respectively indicative of predetermined values in said data, comprising:
   means for generating said mark and space frequency signals;
   function generator means, receptive of said binary data, for producing a first and a second analog signal;
   said first analog signal having a waveform having predetermined maximum and minimum amplitude levels and a predetermined transition waveform, said first analog waveform changing in response to said binary data, between said maximum and minimum levels, in accordance with said predetermined transition waveform;
   said second analog signal having a waveform inversely related to said first waveform; and
   first and second variable gain amplifier means, respectively receptive of said mark frequency and said space frequency signals, and, respectively, having applied as control signals, said first and second analog signals, for respectively modulating the amplitude of said mark and space frequency signals with said first and second analog waveforms.

3. The transmitter of claim 1 wherein said mark and space frequency signal generator generates an MSK signal and includes a common oscillator for generating a local oscillator signal and, further including:
   up converter means receptive of said MSK signal and said local oscillator signal for translating in frequency said MSK signal by a frequency proportional to said local oscillator signal.

4. A method for generating a frequency shift keying (FSK) signal comprising:
   a. generating a first continuous wave signal at a preselected mark frequency and a second continuous wave signal at a preselected space frequency;
   b. generating an FSK signal by switching between said mark and said space frequency signals in accordance with binary data, said mark frequency and said space frequency signals being respectively indicative of a first and a second binary value in said data;
   c. controlling the respective amplitudes of said mark and space frequency signals during said switching to lengthen the switching transition interval between said mark and space frequency signals as compared to an abrupt switching therebetween, thereby controlling the magnitude of the derivitives of the phase of the FSK signal during said switching.

5. A method for generating a frequency shift keying (FSK) signal comprising:
   a. generating a first continuous wave signal at a preselected mark frequency and a second continuous wave signal at a pre-selected space frequency;
   b. generating a first analog signal having a waveform corresponding to said binary data, said first analog waveform having a predetermined maximum amplitude and a predetermined transition waveform,
   c. generating a second analog waveform having both a predetermined maximum amplitude and a predetermined transition waveform inversely related to said first analog waveform,
   d. respectively applying said first and second analog waveforms as control signals to a first and a second variable gain amplifier means, respectively receptive of said mark and space frequency signals,
   e. respectively modulating the amplitudes of said mark and space frequency signals in accordance with said first and second analog waveforms; and
   f. summing said amplitude modulated mark and space frequency signals to generate said FSK signal.

6. The transmitter of claim 1 wherein said FSK signal has a predetermined bit rate and said mark and space frequencies are separated in frequency by an amount substantially equal to one-half of said bit rate.

7. The transmitter of claim 2 wherein said FSK signal has a predetermined bit rate and said mark and space frequencies are separated in frequency by an amount substantially equal to one-half of said bit rate.

8. The method of claim 4 wherein said binary data has a predetermined bit rate, and further comprising the steps of:
   separating in frequency the mark and space frequency signals by an amount substantially equal to one-half of said bit rate.

* * * * *